United States Patent
Li et al.

(10) Patent No.: US 11,970,355 B2
(45) Date of Patent: Apr. 30, 2024

(54) COLLECTION DEVICE AND PREPARATION SYSTEM

(71) Applicant: SUZHOU JERNANO CARBON CO., LTD., Jiangsu (CN)

(72) Inventors: Da Li, Suzhou (CN); Hehua Jin, Suzhou (CN); Qingwen Li, Suzhou (CN); Zhenzhong Yong, Suzhou (CN); Maolin Liu, Suzhou (CN); Dianli Hu, Suzhou (CN)

(73) Assignee: SUZHOU JERNANO CARBON CO., LTD., Jiangsu (CN)

( * ) Notice: Subject to any disclaimer, the term of this patent is extended or adjusted under 35 U.S.C. 154(b) by 825 days.

(21) Appl. No.: 17/042,014

(22) PCT Filed: Mar. 26, 2018

(86) PCT No.: PCT/CN2018/080532
§ 371 (c)(1),
(2) Date: Sep. 25, 2020

(87) PCT Pub. No.: WO2019/183767
PCT Pub. Date: Oct. 3, 2019

(65) Prior Publication Data
US 2021/0163252 A1    Jun. 3, 2021

(51) Int. Cl.
*B65H 54/28* (2006.01)
*B65H 54/70* (2006.01)
(Continued)

(52) U.S. Cl.
CPC ......... *B65H 54/2848* (2013.01); *B65H 54/70* (2013.01); *C01B 32/168* (2017.08); *D01D 7/00* (2013.01); *D01F 9/12* (2013.01)

(58) Field of Classification Search
CPC .. B65H 54/2848; B65H 54/70; C01B 32/168; D01D 7/00; D01F 9/12; D01F 9/133
(Continued)

(56) References Cited

U.S. PATENT DOCUMENTS 3,216,064 A * 11/1965 Kates, Jr. ............... D01H 13/04
19/145.5
4,266,324 A *  5/1981 Hasegawa ................ D01H 5/42
19/239
(Continued)

FOREIGN PATENT DOCUMENTS

CN       201162074 Y    12/2008
CN       202098912 U     1/2012
(Continued)

OTHER PUBLICATIONS

Office Action issued in Chinese Application No. 201810252530.3, dated Mar. 9, 2019, 9 pages.
(Continued)

*Primary Examiner* — Shaun R Hurley
(74) *Attorney, Agent, or Firm* — HSML P.C.

(57) ABSTRACT

The present disclosure relates to a collection device and a preparation system, including a pre-adjustment mechanism which is disposed in a housing and configured to adjust at least one bundle of carbon nanotube aggregates, and includes a first pre-adjustment sub-mechanism and a second pre-adjustment sub-mechanism for adjusting carbon nanotube aggregations along a first direction and a second direction, respectively; a winding mechanism for winding and collecting the carbon nanotube aggregates passing through the pre-adjustment mechanism.

16 Claims, 7 Drawing Sheets

(51) Int. Cl.
    *C01B 32/168*     (2017.01)
    *D01D 7/00*     (2006.01)
    *D01F 9/12*     (2006.01)

(58) Field of Classification Search
    USPC .......................................................... 19/243
    See application file for complete search history.

(56) References Cited

U.S. PATENT DOCUMENTS

| | | | |
|---|---|---|---|
| 5,400,476 A * | 3/1995 | White | G01N 33/362 356/640 |
| 7,597,941 B2 | 10/2009 | Sunkara et al. | |
| 2005/0142385 A1 | 6/2005 | Jin | |
| 2008/0170982 A1 * | 7/2008 | Zhang | D02G 3/44 423/447.3 |
| 2008/0216516 A1 | 9/2008 | Song et al. | |
| 2009/0205374 A1 | 8/2009 | Pata et al. | |
| 2014/0217643 A1 * | 8/2014 | Nikawa | C01B 32/168 423/447.2 |
| 2015/0314562 A1 | 11/2015 | Weisenberger | |
| 2018/0073166 A1 * | 3/2018 | Morihara | C01B 32/168 |

FOREIGN PATENT DOCUMENTS

| | | |
|---|---|---|
| CN | 103031531 | 4/2013 |
| CN | 103922313 | 7/2014 |
| CN | 104310116 | 1/2015 |
| CN | 204401194 U | 6/2015 |
| CN | 105439119 | 3/2016 |
| CN | 105913972 | 8/2016 |
| CN | 106044739 | 10/2016 |
| CN | 106381592 | 2/2017 |
| CN | 106591974 | 4/2017 |
| CN | 106597974 | 4/2017 |
| CN | 206351987 U | 7/2017 |
| EA | 011588 B1 | 4/2009 |
| EP | 2465818 | 6/2012 |
| KR | 10-1718784 B | 3/2017 |
| RU | 2520435 C2 | 6/2014 |
| WO | 2008054409 | 5/2008 |
| WO | 2017131061 | 8/2017 |

OTHER PUBLICATIONS

Office Action issued in Chinese Application No. 201810252530.3, dated May 7, 2020, 10 pages.
International Search Report issued in International Application No. PCT/CN2018/080532, dated Dec. 29, 2018, 2 pages.
Naseva, S. et al., "Mechanical Properties of Filament Wound Pipes: Effects of Winding Angles," Quality of Life, 2015, 6(1-2), pp. 10-15.
Extended European Search Report issued for European Patent Application No. 18912485.2, dated Oct. 11, 2021, 8 pages.
Office Action issued for Japanese Patent Application No. 2021-501063, Dispatch Date: Nov. 1, 2021, 3 pages including partial English machine translation.

* cited by examiner

COLLECTION DEVICE AND PREPARATION SYSTEM

TECHNICAL FIELD

The present disclosure relates to the technical field of carbon nanotube material preparation, in particular to a collection device and a preparation system.

BACKGROUND

Carbon nanotubes (CNTs) are one-dimensional tubular nanomaterial formed by single- or multi-layer graphene crimping. The unique structure thereof brings excellent mechanical, thermal and electrical properties. CNTs have theoretically good mechanical, electrical conductive and thermal conductive properties, and hence have a very large application prospect. Carbon nanotube films and carbon nanotube fibers formed by carbon nanotubes intertwined with one another are common carbon nanotube macroscopic bodies, and can exert excellent performance of carbon nanotubes and have a wide range of application prospects in the fields of electromagnetic shielding, composite materials, electric heating, etc. However, the actual orientation and uniformity of the prepared carbon nanotube macroscopic bodies are poor, that affects various properties of the final macroscopic bodies.

SUMMARY

Based on the above, it is necessary to provide a collection device and a preparation system for addressing at least one of the above technical problems.

The present disclosure provides a collection device for the collection of carbon nanotube films or carbon nanotube fibers, the collection device including:
  a pre-adjustment mechanism for adjusting the orientation of at least one bundle of carbon nanotube aggregates, the pre-adjustment mechanism including a first pre-adjustment sub-mechanism and a second pre-adjustment sub-mechanism, the first pre-adjustment sub-mechanism including at least a first wheel body and a second wheel body rotatably arranged in a first direction for prepressing both sides of the carbon nanotube aggregates; the second pre-adjustment sub-mechanism including at least a third wheel body for drawing the carbon nanotube aggregates;
  a winding mechanism for winding and collecting the carbon nanotube aggregates drawn from the pre-adjustment mechanism.

The above collection device, by adding the first pre-adjustment sub-mechanism and the second pre-adjustment sub-mechanism, both of which adjust the orientation of at least one bundle of carbon nanotube aggregates, improves not only the internal structure of the carbon nanotubes but also the orientation and the uniformity thereof, achieving the control of the mechanical, electrical and thermal properties of the carbon nanotube materials collected, and contributing to the large-scale production of carbon nanotube films or carbon nanotube fibers of carbon nanotube materials with different properties.

In one embodiment, the third wheel body is rotatable and surrounded by a plurality of first annular protrusions provided thereon for adjusting the orientation of the carbon nanotube aggregates.

In one embodiment, the first annular protrusion has a width of no greater than 10 μm, and the adjacent first annular protrusions are spaced from each other by no greater than 100 μm.

In one embodiment, the collection device further includes a first heating mechanism for adjustment the temperature of a contact surface of the first pre-adjustment mechanism and/or the second pre-adjustment mechanism for contacting the carbon nanotube aggregates.

In one embodiment, annular position-limiting slots capable of accommodating carbon nanotube aggregates are provided in the contact surface of the first wheel body and/or the second wheel body for contacting the carbon nanotube aggregates.

In one embodiment, the second pre-adjustment sub-mechanism further includes a fourth wheel body, wherein the fourth wheel body and the third wheel body are spaced and staggered in a second direction and both of them are capable of drawing the carbon nanotube aggregates along the collecting direction.

In one embodiment, the fourth wheel body is rotatable and surrounded by a plurality of second annular protrusions provided thereon for adjusting the orientation of the carbon nanotube aggregates.

In one embodiment, the second annular protrusion has a width of no greater than 10 μm, and the adjacent second annular protrusions are spaced from each other by no greater than 100 μm.

In one embodiment, the first wheel body and the second wheel body are rotated facing towards or away from each other, and the rotation speeds of the third wheel body and the fourth wheel body are not equal.

In one embodiment, the first direction and the second direction are perpendicular to each other.

In one embodiment, the winding mechanism includes a rotary drum being retractable in an axial direction and capable of reciprocating in a direction that is not perpendicular to the axial direction of the rotary drum.

In one embodiment, the winding mechanism includes a first rotating wheel, a second rotating wheel and a collection belt tensioned therebetween; or
  the winding mechanism includes a first rotating wheel, a second rotating wheel and a collection plate disposed therebetween and capable of rotating toward the pre-adjustment mechanism.

In one embodiment, the spacing between the first wheel and the second wheel can be adjusted.

The present disclosure also provides a preparation system for the preparation of carbon nanotube film material or carbon nanotube fiber material, the preparation system including:
  a synthesis device for floating catalytic synthesis of carbon nanotube aggregates, including a reactor having at least one growth tube; and
  a collection device which is any one of the collection devices described above and located. on an outlet end side of the synthesis device for collecting the carbon nanotube aggregates prepared by the synthesis device.

In one embodiment, the end of the growth tube near the collection device is trumpet-shaped or cylindrical.

In one of the embodiments, the growth tube is square shaped.

In one of the embodiments, the preparation system further includes:
  a feeding device for providing reaction raw materials and communicating with an inlet end of the synthesis device, the feeding device including at least one injection mechanism and at least one feeding pipe with one end communicating with the injection mechanism and the other end communicating with the growth tube.

In one embodiment, the synthesis device includes a reactor having a plurality of growth tubes which are arranged in a circular distribution or a matrix distribution.

In one embodiment, the synthesis device further includes a second heating mechanism for adjusting the temperature distribution of respective regions of the inlet ends of the plurality of growth tubes.

REFERENCE SIGNS

100: collection device, 110: First pre-adjustment sub-mechanism, 111: First wheel body, 112: Second wheel body, 120: Second pre-adjustment sub-mechanism, 121: Third wheel body, 122: Fourth wheel body, 130: Winding mechanism, 131: First rotating wheel, 132: Second rotating wheel, 133: Collection plate, 140: First annular protrusion, 150: Second annular protrusion, 160: Annular position-limiting slot;
200: Synthesis device, 210: Reactor, 211: Growth tube, 212: Second heating mechanism;
300: Feeding device, 310: Injection mechanism, 320: Feeding tube, 400: Carbon nanotube aggregates.

DETAILED DESCRIPTION OF EMBODIMENTS

Reference will now be made to the drawings to describe embodiments of the present disclosure in detail, so that the above objects, features and advantages of the present disclosure can be more apparent and understandable. In the following description, numerous specific details are set forth in order to provide a thorough understanding of the present disclosure. However, the present disclosure can be implemented through various other means different from those described herein, and those skilled in the art can make similar improvements without departing from the essence of the present disclosure. Therefore, the present disclosure is not intended to be limited by the specific embodiments disclosed below.

Unless otherwise defined, all terms (including technical and scientific terms) used herein have the same meaning as commonly understood by skilled person in the art to which this disclosure belongs. The terms used herein is for the purpose of describing embodiments only and is not intended to limit the present disclosure. As used herein, the term "and/or" includes any and all combinations of one or more of the associated listed items.

Figure 1:
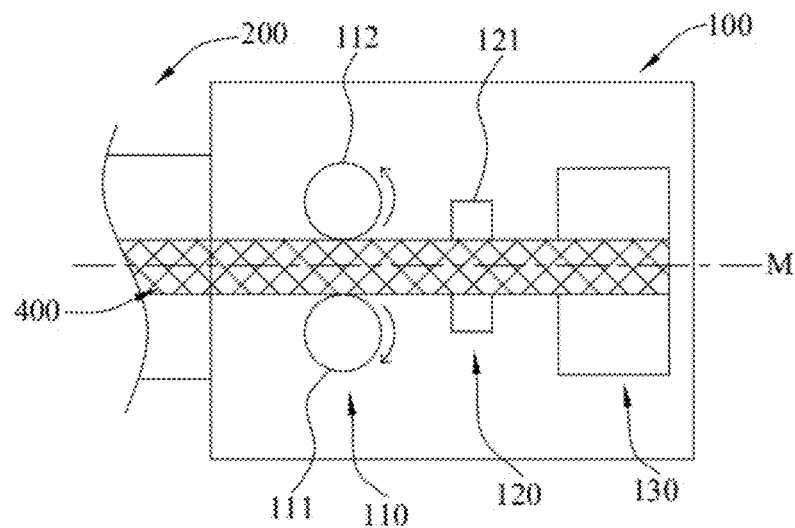
FIG. 1 is a schematic structural diagram of a collection device according to an embodiment of the present disclosure.

FIG. 1 illustrates the collection device 100 of the present disclosure. The collection device 100 is used for collecting carbon nanotube films or carbon nanotube fibers. The collection device 100 includes a housing that communicates with an outlet end of a synthesis device 200, and a pre-adjustment mechanism and a winding mechanism 130 provided inside the housing.

The pre-adjustment mechanism is disposed within the housing and serves to adjust the orientation of at least one bundle of carbon nanotube aggregates 400. Specifically, the pre-adjustment mechanism is used to adjust the orientation of a bundle of carbon nanotube aggregates and also can be used to adjust the orientations of two or more bundles of carbon nanotube aggregates.

The pre-adjustment mechanism includes a first pre-adjustment sub-mechanism 110 and a second pre-adjustment sub-mechanism 120.

The first pre-adjustment sub-mechanism 110 includes at least a first wheel body 111 and a second wheel body 112 that are rotatable and arranged in a first direction for prepressing both sides of the carbon nanotube aggregates. The second pre-adjustment sub-mechanism 120 includes at least a third wheel 121 for drawing the carbon nanotube aggregates. The first wheel body 111, the second wheel body 112, and the third wheel body 121 each may be rotatable roller or roll wheel structure, and has a size matching the carbon nanotube aggregates. In this embodiment, the carbon nanotube aggregates firstly undergo a first orientation adjustment via the first pre-adjustment mechanism 110, and then undergo a second orientation adjustment via the second pre-adjustment sub-mechanism 120.

The winding mechanism 130 is used for winding and collecting the carbon nanotube aggregates drawn from the pre-adjustment mechanism.

The above collection device 100, by adding the first pre-adjustment sub-mechanism 110 and the second pre-adjustment sub-mechanism 120, both of which adjust the orientation of at least one bundle of carbon nanotube aggregates respectively, improves not only the internal structure of the carbon nanotubes but also the orientation and the uniformity thereof, achieving the control of the mechanical, electrical and thermal properties of the carbon nanotube material collected, and contributing to the large-scale production of carbon nanotube films or carbon nanotube fibers with different properties.

Referring to FIG. 1, a direction of the connection line from the outlet end to the collection mechanism is defined as direction M, an end in the direction M near the outlet end side is defined as a rear end, and an end far away from the outlet end side is denied as a front end. Also right and left ends and upper and lower ends of the direction M are defined correspondingly as left, right and upper, lower sides, respectively.

Example 1

Figure 2:
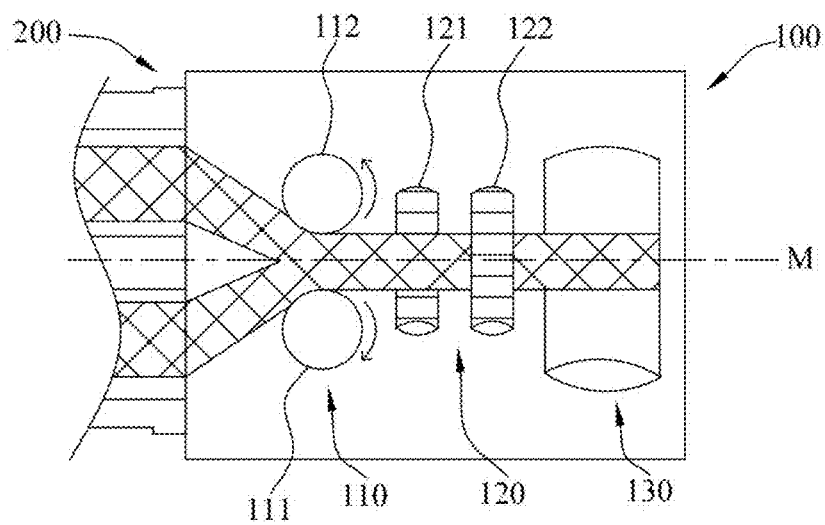
FIG. 2 is a schematic structural diagram of a collection device according to another embodiment of the present disclosure.

FIG. 2 shows a collection device 100 for a horizontal furnace. The collection device 100 is adapted to collect carbon nanotube films or carbon nanotube fibers. The collection device 100 includes a housing, a pre-adjustment mechanism and a winding mechanism 130, wherein, the pre-adjustment mechanism includes a first pre-adjustment sub-mechanism 110 and a second pre-adjustment sub-mechanism 120 and is adapted to adjust multiple bundles of carbon nanotube aggregates.

The first adjustment sub-mechanism 110 is disposed near the outlet end, and the second pre-adjustment sub-mechanism 120 is disposed between the first adjustment sub-mechanism 110 and the winding mechanism 130. The first wheel body 111 and the second wheel body 112 are preferably arranged on the left and right sides of the direction M respectively, that is, the first wheel body 111 and the second wheel body 112 are arranged on the left and right sides of the carbon nanotube aggregates respectively.

Since the carbon nanotube aggregates are mostly in multiple bundles in most cases and the drawn direction of each bundle of carbon nanotube aggregates is inconsistent with the axial direction of the carbon nanotubes, it is difficult to achieve uniform collection of multiple bundles of carbon nanotube aggregates. However, the internal structure of the carbon nanotube material has a great impact on various properties, thus, the overall performance of the carbon nanotube material will be affected. By arranging the first wheel body 111 and the second wheel body 112 disposed on the left and right sides respectively, multiple bundles of carbon nanotube aggregates can be integrated into one bundle so that the integrated carbon nanotube aggregates can be collected in a complete shape, thereby optimizing the uniformity of the collected carbon nanotube aggregate material. Similarly, by adjusting the rotation speeds of the first wheel body 111 and the second wheel body 112, the positive pressure exerted by the first wheel body 111 and the second wheel body 112 onto the carbon nanotube aggregates can be changed to achieve different bundling and drawing effects, so as to adjust the orientation of the carbon nanotube aggregates, and therefore various properties of the carbon nanotube material can be controlled. At this time, the spacing between the first wheel body 111 and the second wheel body 112, and the rotation speeds and positions thereof, can be adjusted according to the yield and output rate of the carbon nanotube aggregates so as to achieve the best pre-adjustment effect. It should be noted that in this case, the number of the wheel bodies disposed in the first direction may be always 2, that is, there are only the first wheel body 111 and the second wheel body 112. Of course, the number of the wheel bodies disposed in the first direction may be multiple other than 2, and preferably may be the number matching with the multiple bundles of carbon nanotube aggregates.

The second pre-adjustment sub-mechanism 120 includes a third wheel body 121 disposed on the lower side of the direction M, that is, the third wheel body 121 is disposed on the lower side of the carbon nanotube aggregates. The third wheel body 121 is rotatable and surrounded by a plurality of first annular protrusions 140 provided thereon for adjusting the orientation of the carbon nanotube aggregates.

Figure 3:
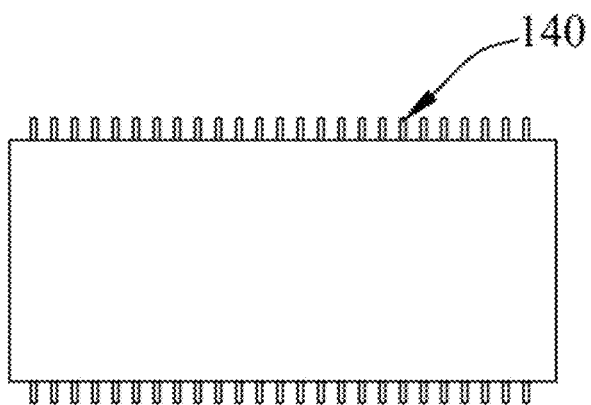
FIG. 3 is a sectional view of the third wheel body in FIG. 2.

Referring to FIG. 3, a plurality of first annular protrusions 140 are disposed on a contact surface of the third wheel body 121 for contacting the carbon nanotube aggregates, and the plurality of first annular protrusions 140 are arranged as surrounding the axial direction of the third wheel body 121. The width of the first annular protrusion 140 is no greater than 10 μm, and the spacing between the adjacent first annular protrusions 140 is no greater than 100 μm. The first wheel body 111 and the second wheel body 112 are rotatable and their rotation directions can be the same or different. Preferably, the first wheel body 111 and the second wheel body 112 have rotation directions being opposite, and further preferably, they can rotate facing towards or away from each other.

The width of the first annular protrusion 140 is no greater than 10 μm, and the spacing between the adjacent first annular protrusions 140 is no greater than 100 μm. Preferably, the width of the first annular protrusion 140 is 0.2 to 5 μm, and the spacing between the adjacent first annular protrusions 140 is 50 to 90 μm. The height of the first annular protrusion 140 is 1 to 10 mm. Further, the first annular protrusion 140 may be integrally formed with the third wheel body 121, or may be separately formed and detachably mounted on the third wheel body 121. The first annular protrusion 140 can be prepared by laser etching or chemical etching or printing, etc.

As the third wheel body 121 rotates, the third wheel body 121 brings the corresponding first annular protrusion 140 to rotate. A plurality of spaced first annular protrusions 140 can exert a force along the tangential direction on the carbon nanotube aggregates to help regulate the internal structure of the carbon nanotube aggregates along the tangential direction. In addition, the first annular protrusions 140 each can also exert a certain positive pressure on the carbon nanotube aggregates, and by adjusting the rotation speed of the third wheel 121, the third wheel 121 can apply different positive pressures on the carbon nanotube aggregates to achieve the drawing of the carbon nanotube aggregates to adjust the orientation of the carbon nanotube aggregates so that various properties of the carbon nanotube material can be controlled.

Referring to FIG. 2, in this embodiment, the second pre-adjustment sub-mechanism 120 further includes at least a rotatable fourth wheel body 122. The fourth wheel body 122 and the third wheel body 121 are spaced and staggered in the second direction and each of them is capable of drawing the carbon nanotube aggregates along the collecting direction. The second direction is different from the first direction. Preferably, the second direction and the first direction are perpendicular to each other. Of course, the second direction and the first direction may also be other cases.

Further, the fourth wheel body 122 and the third wheel body 121 are disposed on the upper and lower sides or the left and right sides of the Direction M, and the disposing positions of the two wheel bodies may be adjusted correspondingly according to the disposal of the first wheel body 111 and the second wheel body 112. Since the fourth wheel body 122 is added, by adjusting the rotation speeds of the fourth wheel body 122 and the third wheel body 121 to be different, the positive pressure along the second direction applied by the third wheel body 121 and the fourth wheel body 122 on the carbon nanotube aggregates can be changed to achieve further drafting of the carbon nanotube aggregates and further adjusting the orientation of the carbon nanotube aggregates so as to realize the controllable adjustment of various properties of the carbon nanotube material. In this embodiment, the number of the third wheel body 121 and that of the fourth wheel body 122 are the same and both are one. In other embodiments, the number of the third wheel body 121 and the fourth wheel body 122 may be two or more. In this way, various degree of drawing of the carbon nanotube aggregates is performed by adding a plurality of wheel bodies to further adjust the microstructure of the carbon nanotube aggregates and to improve the orientation of the carbon nanotube aggregates.

Figure 4:
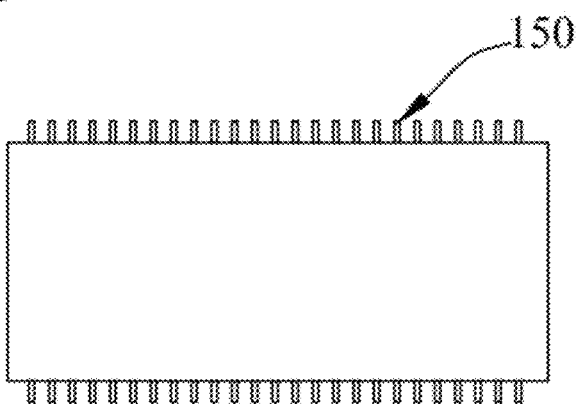
FIG. 4 is a sectional view of the fourth wheel body in FIG. 2.

Further, referring to FIG. 4, the fourth wheel body is surrounded by a plurality of second annular protrusions 150 provided thereon for adjusting the orientation of the carbon nanotube aggregates. Specifically, a plurality of second annular protrusions 150 can be disposed on a contact surface of the fourth wheel body 122 for contacting the carbon nanotube aggregates and those protrusions 150 may be provided as surrounding the axial direction of the fourth wheel body 122.

The width of the second annular protrusion 150 is no greater than 10 µm, and the spacing between the adjacent second annular protrusions 150 is no greater than 100 µm. Similar to the first annular protrusion 140, preferably, the width of the second annular protrusion 150 is 0.2 to 5 µm, and the spacing between the adjacent second annular protrusions 150 is 1 to 80 µm. The height of the second annular protrusion 150 is 1 to 10 mm. Further, the second annular protrusion 150 may be integrally formed with the fourth wheel body 122, or may be separately formed and detachably mounted on the fourth wheel body 122. The second annular protrusion 150 can be prepared by laser etching or chemical etching or printing, etc.

In one embodiment, the first annular protrusions 140 and the second annular protrusions 150 may be disposed symmetrically or may be staggered.

As the third wheel body 121 and the fourth wheel body 122 rotate, the third wheel body 121 and the fourth wheel body 122 bring the corresponding first annular protrusion 140 and second annular protrusions 150 to rotate. A plurality of spaced annular protrusions can exert a force along the tangential direction on the carbon nanotube aggregates to help adjust the internal structure of the carbon nanotube aggregates along the tangential direction, optimizing the adjustment effect of orientation. In addition, the first annular protrusions 140 and the second annular protrusions 150 each can also exert a certain positive pressure on the carbon nanotube aggregates; and by adjusting the rotation speeds of the third wheel 121 and the fourth wheel body 122 to be different, different positive pressures along the first direction will be applied by the third wheel 121 and the fourth wheel body 122 on the carbon nanotube aggregates, so as to achieve the drawing of the carbon nanotube aggregates to adjust the orientation of the carbon nanotube aggregates, and therefore various properties of the carbon nanotube material can be controlled.

In one embodiment, the respective widths and spacings of the first annular protrusions 140 and the second annular protrusions 150 may be the same or different. When the respective widths and the spacings of the first annular protrusions 140 and second annular protrusions 150 are different, the distribution density of the respective protrusions can be adjusted so as to achieve different orientation adjustment effects.

Figure 5:
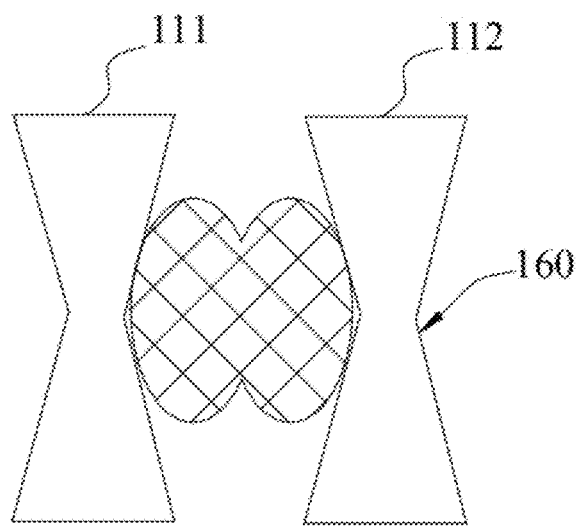
FIG. 5 is a side view of the first pre-adjustment sub-mechanism of FIG. 2.

In one embodiment, referring to FIG. 5, an annular position-limiting slot 160 capable of accommodating carbon nanotube aggregates is provided in the contact surface of the first wheel body 111 and/or the second wheel body 112 for contacting the carbon nanotube aggregates.

The annular position-limiting slot 160 has a slot span matching the size of the carbon nanotube aggregates to be accommodated. In this embodiment, the shape of the cross-section of the annular position-limiting slot 160 in the axial direction may be a symmetrical triangle. In another embodiment, the shape of the cross-section of the annular position-limiting slot 160 in the axial direction may be a symmetrical arc. In other embodiments, the annular position-limiting slot 160 may be other shapes.

Providing the annular position-limiting slot 160 can not only fix and limit the position of the carbon nanotube aggregates to prevent the carbon nanotube aggregates from moving up and down when being pre-pressed by the first pre-adjustment sub-mechanism 110, but also effectively gathers the carbon nanotube aggregates in the annular position-limiting slot 160 to further ensure uniform collection and improve the orientation of the collected carbon nanotube aggregates.

In one embodiment, the collection device 100 further includes a first heating mechanism (not shown in the figures) which is disposed in the housing and configured to adjust the temperature of the contact surface of the first pre-adjustment mechanism 110 and/or the second pre-adjustment mechanism for contacting the carbon nanotube aggregates.

In one embodiment, the first heating mechanism includes a heating resistance wire and a controller. The heating resistance wire is arranged in the end or inside of the first pre-adjustment sub-mechanism 110 and/or the second pre-adjustment sub-mechanism 120. The controller is arranged inside the housing and configured to control the heat generated by the heating resistance wire. The first heating mechanism may also include a thermocouple or a thermodetector that measures the temperature of the corresponding contact surface of the pre-adjustment mechanism.

In one embodiment, the temperature of the first heating mechanism may be set in the range of 100 to 500° C. Further, the temperature of the first heating mechanism may be set in the range of 200 to 400° C. It should be noted that there is preferably an inert environment inside the housing of the collection device 100.

By providing the first heating mechanism, the gas inside the carbon nanotube aggregates can be expelled via proper heating, and the denseness of the collected carbon nanotube product can be improved accordingly. In addition, the temperature of the contact surface contacting the carbon nanotube aggregates can also be controlled, thereby helping to improve the adjustment effect of the pre-adjustment mechanism on the internal structure of the carbon nanotube aggregates, and improve the orientation and uniformity of the carbon nanotubes, and then achieving the regulation of the various properties of the carbon nanotube material.

In this embodiment, the winding mechanism 130 may be a roller that can rotate to collect the carbon nanotube aggregates. Since carbon nanotube aggregates usually contain a trace amount of iron, the roller can be made of a micro-magnetic material, which can facilitate the adsorption and collection of the carbon nanotube aggregates.

In one embodiment, the winding mechanism 130 may be a rotary drum (not shown in the figures) that is retractable in the axial direction. When the collected carbon nanotube aggregates are carbon nanotube fibers, the rotary drum May need not to move; and when the collected carbon nanotube aggregates are carbon nanotube films, the rotary drum may perform a one-way motion or a reciprocating motion so that a certain area of carbon nanotube film can be collected. The directions of the reciprocating motion are not perpendicular to the axial direction of the rotary drum. Preferably, the directions of the reciprocating motion are parallel to the axial direction of the rotary drum. Of course, the directions of the reciprocating motion may be angled with respect to the axial direction of the rotary drum to achieve the collection of the carbon nanotube film. The provided rotary drum can be retractable along the axial direction, so that the area of the collected carbon nanotube film can be further changed, and the thickness of the prepared carbon nanotube film can be controlled, thereby obtaining carbon nanotube film materials with different performances.

In another embodiment, the winding mechanism 130 may include a first rotating wheel, a second rotating wheel, and a collection belt (not shown in the figures) tensioned between the first rotating wheel and the second rotating wheel. The axial direction of the first rotating wheel and the second rotating wheel is perpendicular to the extension line direction of the outlet end. In one embodiment, the spacing between the first rotating wheel and the second rotating wheel can be adjusted. Therefore, by adjusting the spacing between the first rotating wheel and the second rotating wheel, the size in its width direction of the collected carbon nanotube aggregate film can be adjusted so as to adjust the area of the carbon nanotube film.

Figure 6:
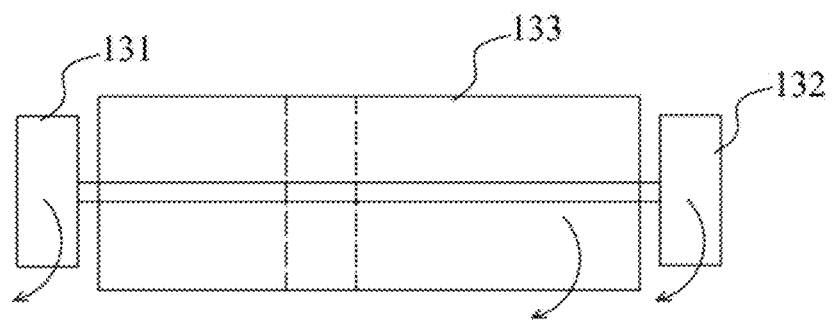
FIG. 6 is a schematic structural diagram of a winding mechanism according to an embodiment of the present disclosure.

In yet another embodiment, referring to FIG. 6, the winding mechanism 130 may include a first rotating wheel 131, a second rotating wheel 132 and a collection plate 133 disposed therebetween and being capable of rotating towards the pre-adjustment mechanism. The collection plate 133 may be a plate that is slightly magnetic and has a certain thickness. In one embodiment, the spacing between the first rotating wheel 131 and the second rotating wheel 132 can be adjusted. Correspondingly, the collection plate 133 can be provided as a retractable plate, then by adjusting the spacing between the first rotating wheel 131 and the second rotating wheel 132, the size in its length direction of the collected carbon nanotube aggregate film can be adjusted so as to adjust the area of the carbon nanotube film.

Example 2

Figure 7:
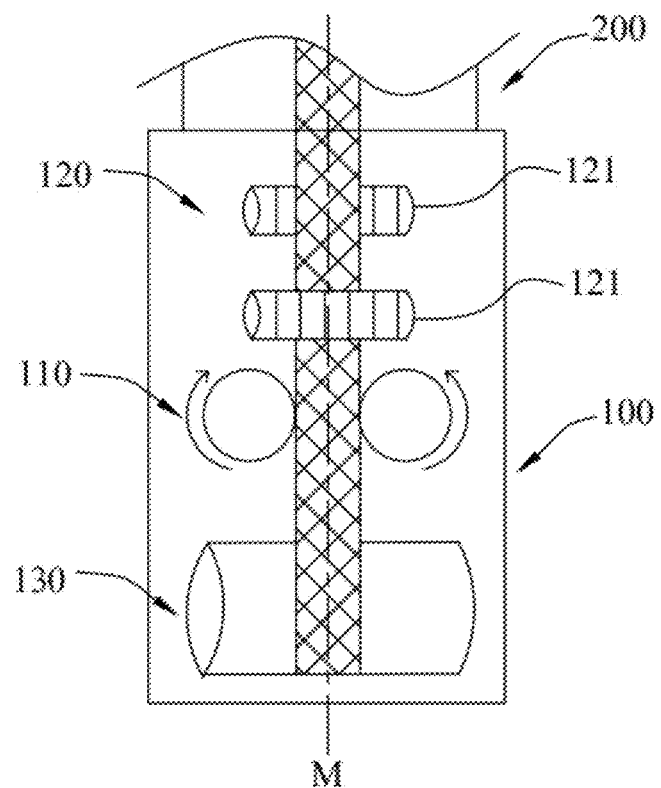
FIG. 7 is a schematic structural diagram of a collection device according to another embodiment of the present disclosure.

FIG. 7 shows a collection device 100 for a vertical furnace. The collection device 100 is configured to collect carbon nanotube films or carbon nanotube fibers. The collection device 100 includes a housing that communicates with the outlet end of the synthesis device 200, and a pre-adjustment mechanism and a winding mechanism 130 both disposed in the housing. The pre-adjustment mechanism includes a first pre-adjustment sub-mechanism 110 and a second pre-adjustment sub-mechanism 120, and is configured to adjust the orientation of a bundle of carbon nanotube aggregates.

In addition to being adaptable to collect the carbon nanotube films or the carbon nanotube fibers grown by the vertical furnace, this example further differs from Example 1 in that the second pre-adjustment sub-mechanism 120 is disposed close to the outlet end of the synthesis device 200 and that the first pre-adjustment sub-mechanism 110 is disposed between the second pre-adjustment sub-mechanism 120 and the winding mechanism 130.

For other content in this example, reference may be made to the Example 1, and details are not described herein again.

The present disclosure also provides a preparation system for the preparation of carbon nanotube film material or carbon nanotube fiber material. The preparation system is described in detail with reference to the drawings.

Example 3

Figure 8:
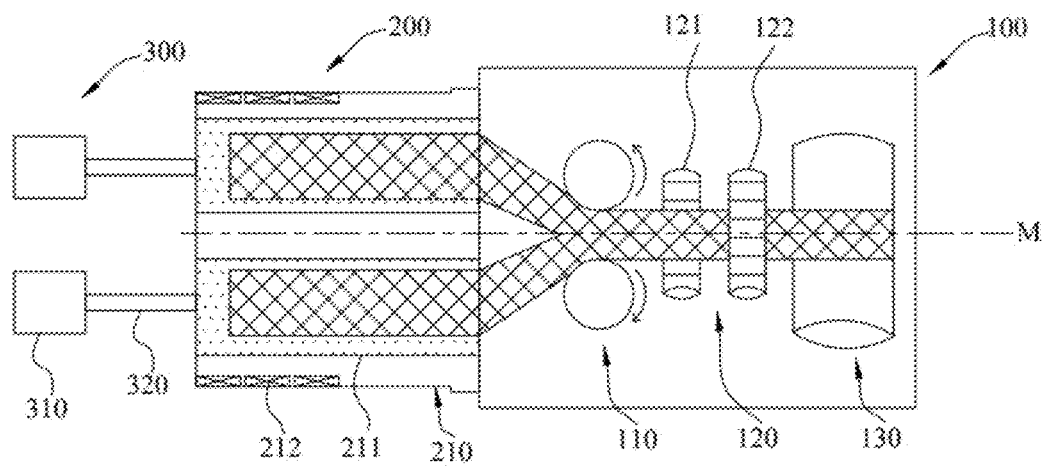
FIG. 8 is a schematic structural diagram of a collection device according to an embodiment of the present disclosure.

FIG. 8 shows a preparation system including a horizontal furnace according to an embodiment of the present disclosure. The preparation system includes a synthesis device 200 and a collection device 100. The synthesis device is adapted to floating catalytically synthesizing carbon nanotube aggregates. The synthesis device 200 includes a reactor 210 having at least one growth tube 211. The collection device 100 is located at an outlet end side of the synthesis device 200, and configured to collect the carbon nanotube aggregates prepared by the synthesis device 200. The collection device 100 communicates with the outlet end side of the synthesis device 200, for example, the collection device 100 can be sealingly connected to the synthesis device 200 via a flange (not shown in the figures).

In this embodiment, the reactor 210 may have a multi-tube horizontal structure, and the number of the growth tubes 211 is two. A plurality of growth tubes 211 are disposed inside the reactor 210 and share one reaction furnace. In this way, by providing multiple tubes, the output of carbon nanotubes can be greatly increased, and the quality of carbon nanotubes in each growth tube 211 can also be ensured, so that the performance of the entire carbon nanotube material can be improved. Of course, in other embodiments, the number of growth tubes 211 may be one or more other than two.

The reactor 210 may be horizontally disposed, but it may also have a multi-tube structure inclined at a certain angle certainly. The growth tube 211 may be made of quartz, corundum, or other materials commonly used in the art. In one embodiment, the shape of the growth tube 211 is square, so that the structure of the carbon nanotube aggregates generated in the growth tube 211 can be changed, thereby adjusting the uniformity of the collected carbon nanotube aggregates. Of course, in other embodiments, the growth tube 211 may has a commonly used hollow round tube structure.

In this embodiment, an end of the growth tube 211 near the collection device 100 is trumpet-shaped. Therefore, since it is necessary to introduce carrier gas into the process of the floating catalytic synthesis of carbon nanotube aggregates, turbulent flow will occur inside the growth tube 211 and the carbon nanotube aggregates will float upward and easily adhere to the inner wall of the growth tube 211, resulting in collection interruption. By providing the distal end of the growth tube 211 in a trumpet shape, the probability of the carbon nanotube aggregates adhering to the inner wall of the growth tube 211 can be reduced so as to increase the continuity of collection of the carbon nanotube aggregates. Of course, in other embodiments, the end of the growth tube 211 near the collection device 100 may have cylindrical or other conventional shapes.

The preparation system also includes a feeding device 300, Which is in communication with the inlet end of the synthesis device 200 for providing reaction raw materials.

Further, the feeding device 300 may include at least one injection mechanism 310 and at least one feeding pipe 320. One end of the feeding pipe 320 communicates with the injection mechanism 310 and the other end communicates with the growth pipe 211. The injection mechanism 310 may be one of a syringe pump, a liquid injector, and an ultrasonic atomization injection mechanism that can regulate the injection rate.

In this embodiment, the numbers of the feeding tube 320 and the injection mechanism 310 are all matching the number of the growth tubes 211. In this case, the feeding tubes 320 can be connected in series or side-by-side. Therefore, the carbon nanotube material with different internal structures can be separately regulated by controlling the injection mechanism 310 so as to regulate the performance of the carbon nanotube material.

In one embodiment, the number of the feeding tube 320 and that of the injection mechanism 310 each may be one, which is simple structure and easy to operate. In another embodiment, there may be multiple feeding pipes 320 and one injection mechanism 310. Such multiple feeding pipes 320 may share one injection mechanism 310. Of course, the number of feeding tubes 320 and the injection mechanism 310 may also be other reasonable values.

It should be noted that multiple growth tubes 211 can be used to grow carbon nanotube aggregates to produce pure carbon nanotube materials. In addition, one or more of the growth tubes 211 can also be provided to prepare other materials to prepare a composite material containing carbon nanotubes so that the composite material will have different properties and the application field of the materials will be widened.

Figure 9:
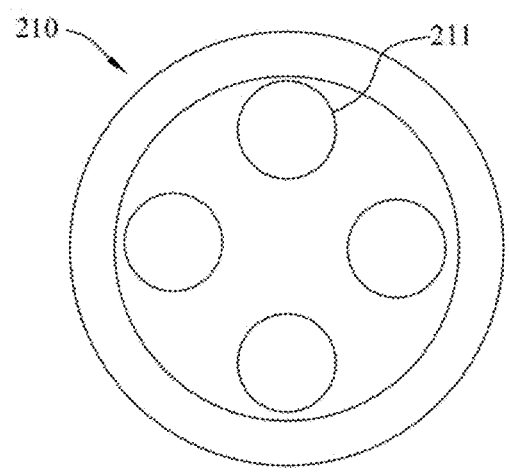
FIG. 9 is a side view of a partial structure of a synthesis device according to an embodiment of the present disclosure.

In one embodiment, referring to FIG. 9, the synthesis device 200 includes a reactor 210 having a plurality of growth tubes 211 which may be arranged in an annular manner. In other embodiments, the plurality of growth tubes 211 may be arranged in a side-by-side or a matrix manner.

Further, continuing to refer to FIG. 8, the synthesis device 200 further includes a second heating mechanism 212 for adjusting the temperature distribution of each region of the inlet ends of the plurality of growth tubes 211. In this embodiment, the second heating mechanism 212 may be three spaced-apart heaters disposed on the inner wall of the reactor 210 to adjust the temperature of each area of the inlet ends of the growth tubes 211, thereby controlling the growth of the carbon nanotube aggregates.

For details of the collection device 100, reference may be made to the Example 1, and details are not described herein again.

The carbon nanotube film material can be prepared by the preparation system of this embodiment. The preparation step includes: dissolving a catalyst and a growth promoter in a carbon source to prepare a reaction solution firstly; introducing the reaction solution and carrier gas into the growth tubes 211 in the reactor 210 through the feeding device 300 to conduct a catalytic cracking reaction to generate continuous carbon nanotube aggregates; and collecting the continuous carbon nanotube aggregates to obtain carbon nanotube films. Since the preparation process of the carbon nanotube film is relatively common, the raw material, the ratio and the technological condition in the above-mentioned preparation process may be those commonly used in the field, and will not be described here.

The carbon nanotube film product prepared by using the preparation system of the present embodiment (including a pre-adjustment mechanism) was labeled as Sample 1. In order to explain the role played by the pre-adjustment mechanism, the pre-adjustment mechanism was removed from the preparation system in this embodiment while other mechanisms therein was maintained unchanged, then the obtained preparation system was used as a comparative preparation system (without a pre-adjustment mechanism) and a carbon nanotube material film product was prepared according to the technological conditions of the preparation of Sample 1. The as-prepared product is labeled Sample 2.

Figure 10:
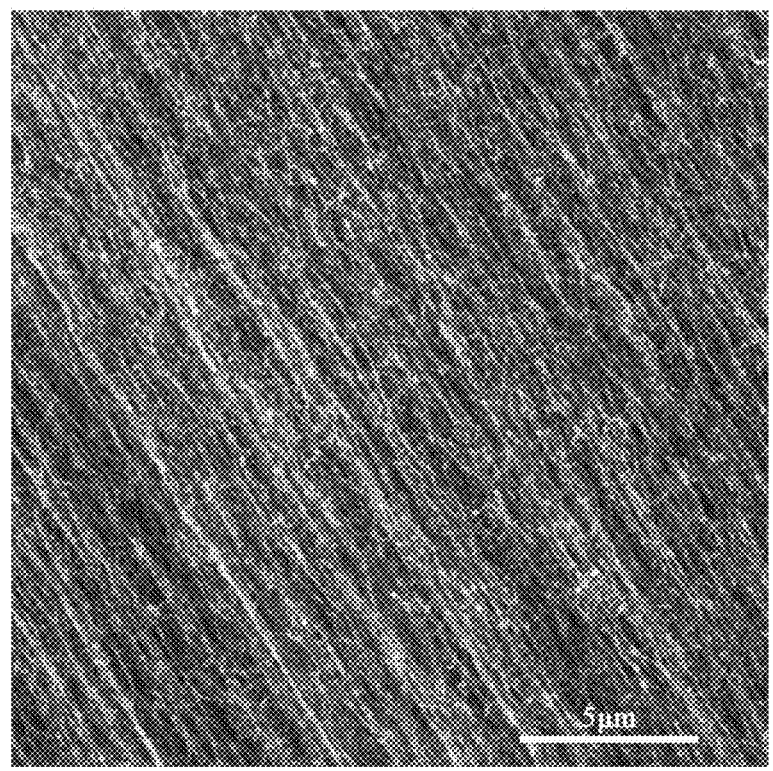
FIG. 10 is an SEM image of Sample 1 of a carbon nanotube film product prepared by a preparation system according to an embodiment of the present disclosure.
Figure 11:
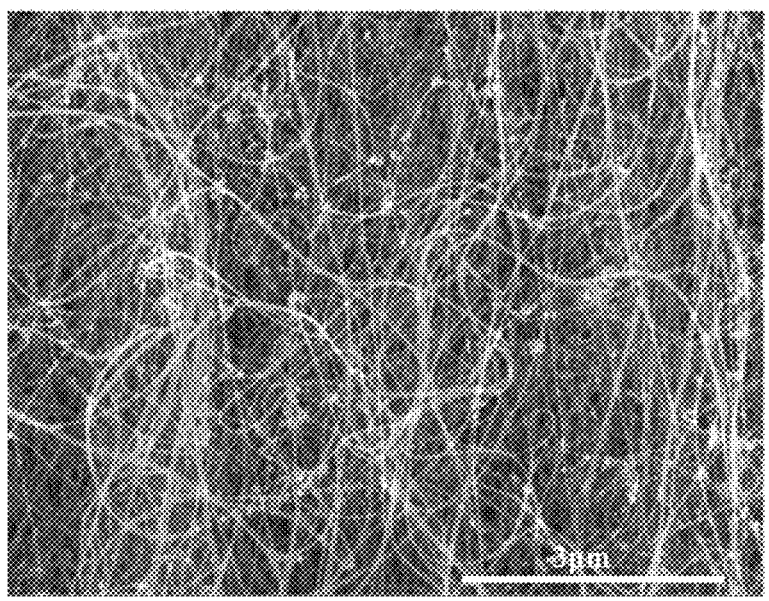
FIG. 11 is an SEM image of Sample 2 of a carbon nanotube film product prepared by a comparative preparation system.

FIGS. 10 and 11 are SEM images of Sample 1 and Sample 2, respectively. By comparison, the orientation of the carbon nanotube material film adjusted by the pre-adjustment mechanism (Sample 1) is better than the carbon nanotube material film without adjusting by the pre-adjustment mechanism (Sample 2).

Figure 12:
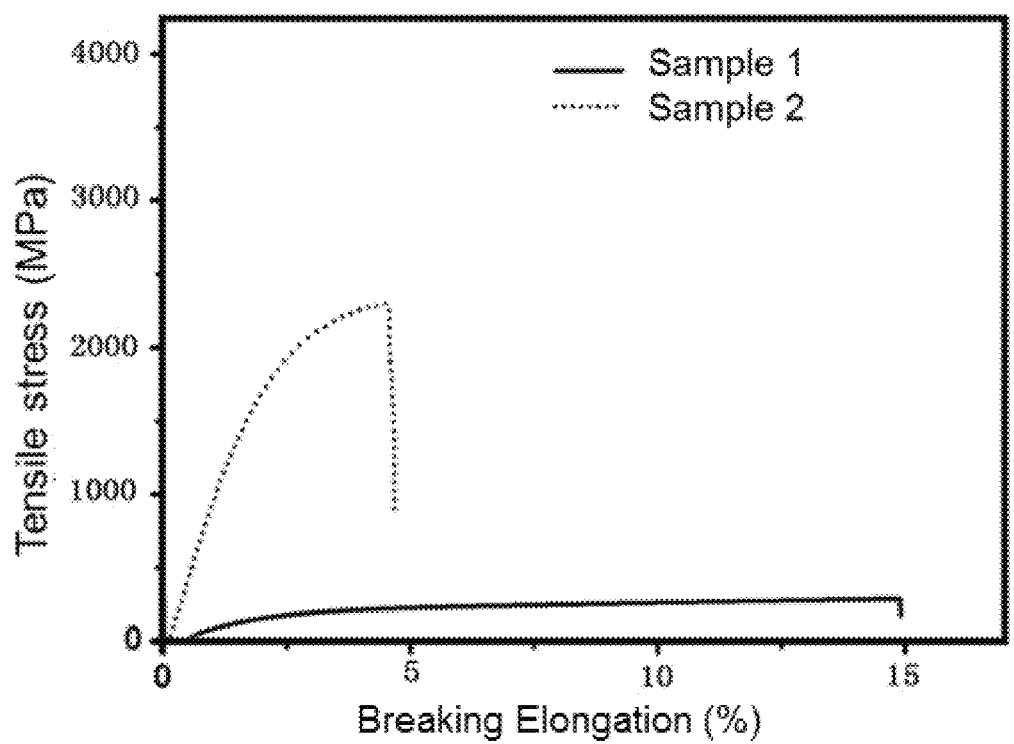
FIG. 12 is a graph showing the tensile stress—breaking elongation curves of the two carbon nanotube film products.

FIG. 12 is a graph of tensile stress-breaking elongation for Samples 1 and 2. By comparison, the mechanical properties of the carbon nanotube material film adjusted by the pre-adjustment mechanism (Sample 1) is better than the carbon nanotube material film without adjusting by the pre-adjustment mechanism (Sample 2).

Example 4

Figure 13:
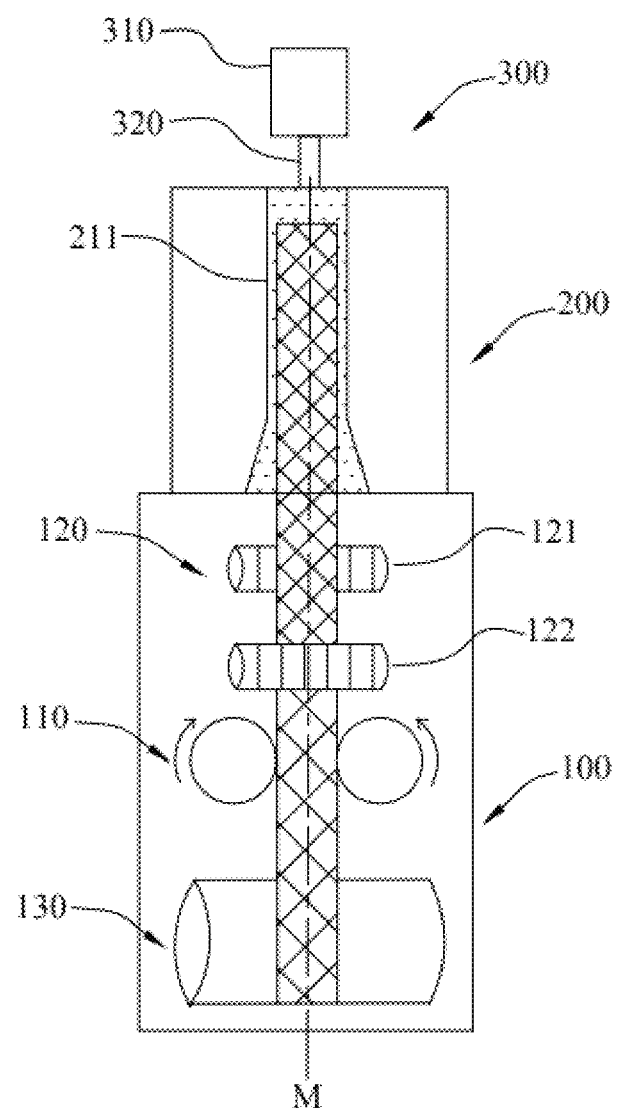
FIG. 13 is a schematic structural diagram of a preparation system according to another embodiment of the present disclosure.

FIG. 13 shows a preparation system including a vertical furnace according to another embodiment of the present disclosure. The preparation system includes a synthesis device 200 and a collection device 100. The synthesis device 200 is used for the floating catalytic synthesis of carbon nanotube aggregates. The synthesis device 200 includes a reactor 210 having at least one growth tube 211. The collection device 100 communicates with the outlet end of the synthesis device 200, for collecting the carbon nanotube aggregates prepared by the synthesis device 200. Specifically, the collection device 100 can be sealingly connected to the synthesis device 200 via a flange (not shown in the figures).

In this embodiment, the reactor 210 may have a single-tube vertical structure. In other embodiment, the reactor 210 may have a multi-tube vertical structure. The reactor 210 may be vertically disposed, but it may also have a structure inclined at a certain angle certainly.

For other details of the collection device 100, reference may be made to the Example 2, and details are not described herein again.

For other content in this embodiment, reference may be made to the Example 3, and details are not described herein again.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

The above embodiments merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the scope of protection of the present disclosure shall be subject to the appended claims.

The invention claimed is:

1. A collection device for collection of carbon nanotube films or carbon nanotube fibers, comprising:
a pre-adjustment mechanism for adjusting orientation of at least one bundle of carbon nanotube aggregates, wherein the pre-adjustment mechanism comprises a first pre-adjustment sub-mechanism at least including a first wheel body and a second wheel body that are rotatable and disposed in a first direction for pre-pressing both sides of the carbon nanotube aggregates, and a second pre-adjustment sub-mechanism at least including a third wheel for drawing the carbon nanotube aggregates; and a winding mechanism for winding and collecting the carbon nanotube aggregates drawn from the pre-adjustment mechanism, wherein the third wheel body is rotatable and surrounded by a plurality of first annular protrusions provided thereon for adjusting the orientation of the carbon nanotube aggregates.

2. The collection device of claim 1, wherein the first annular protrusion has a width of no greater than 10 μm and adjacent first annular protrusions are spaced from each other by no greater than 100 μm.

3. The collection device of claim 1, wherein the second pre-adjustment sub-mechanism further comprises a fourth wheel body, wherein the fourth wheel body and the third wheel body are spaced and staggered in a second direction and both are capable of drawing the carbon nanotube aggregates along a collecting direction.

4. The collection device of claim 3, wherein the fourth wheel body is rotatable and surrounded by a plurality of second annular protrusions provided thereon for adjusting the orientation of the carbon nanotube aggregates.

5. The collection device of claim 3, wherein the first wheel body and the second wheel body are rotatable facing towards or away from each other, and rotation speeds of the third wheel body and the fourth wheel body are not equal.

6. The collection device of claim 1, wherein the winding mechanism comprises a rotary drum which is retractable in an axial direction and capable of reciprocating in a direction that is not perpendicular to the axial direction of the rotary drum.

7. The collection device of, claim 1 wherein the winding mechanism comprises a first rotating wheel, a second rotating wheel and a collection belt tensioned therebetween.

8. A preparation system for the preparation of carbon nanotube film material or carbon nanotube fiber material, comprising:

a synthesis device for floating catalytic synthesis of carbon nanotube aggregates, including a reactor having at least one growth tube; and the collection device of claim 1 located on an outlet end side of the synthesis device for collecting the carbon nanotube aggregates prepared by the synthesis device.

9. The preparation system of claim 8, wherein an end of the growth tube near the collection device is trumpet-shaped or cylindrical.

10. The preparation system of claim 9, further comprising:

a feeding device for providing reaction raw materials and communicating with an inlet end of the synthesis device, the feeding device including at least one injection mechanism and at least one feeding pipe having one end communicating with the injection mechanism and the other end communicating with the growth tube.

11. The preparation system of claim 8, further comprising:

a feeding device for providing reaction raw materials and communicating with an inlet end of the synthesis device, the feeding device including at least one injection mechanism and at least one feeding pipe having one end communicating with the injection mechanism and the other end communicating with the growth tube.

12. The preparation system of claim 11, wherein the synthesis device comprises a reactor having a plurality of growth tubes some of which are arranged in a circular distribution or a matrix distribution.

13. The preparation system of claim 12, wherein the synthesis device further comprises a second heating mechanism for adjusting temperature distribution of respective regions of the inlet ends of the some of the plurality of growth tubes.

14. The collection device of claim 1, wherein the winding mechanism comprises a first rotating wheel, a second rotating wheel and a collection plate disposed therebetween and capable of rotating toward the pre-adjustment mechanism.

15. A collection device for collection of carbon nanotube films or carbon nanotube fibers, comprising:

a pre-adjustment mechanism for adjusting orientation of at least one bundle of carbon nanotube aggregates, wherein the pre-adjustment mechanism comprises a first pre-adjustment sub-mechanism at least including a first wheel body and a second wheel body that are rotatable and disposed in a first direction for pre-pressing both sides of the carbon nanotube aggregates, and a second pre-adjustment sub-mechanism at least including a third wheel for drawing the carbon nanotube aggregates;

a winding mechanism for winding and collecting the carbon nanotube aggregates drawn from the pre-adjustment mechanism; and a first heating mechanism for adjusting a temperature of a contact surface of the first pre-adjustment mechanism and/or the second pre-adjustment mechanism for contacting the carbon nanotube aggregates.

16. A collection device for collection of carbon nanotube films or carbon nanotube fibers, comprising:

a pre-adjustment mechanism for adjusting orientation of at least one bundle of carbon nanotube aggregates, wherein the pre-adjustment mechanism comprises a first pre-adjustment sub-mechanism at least including a first wheel body and a second wheel body that are rotatable and disposed in a first direction for pre-pressing both sides of the carbon nanotube aggregates, and a second pre-adjustment sub-mechanism at least including a third wheel for drawing the carbon nanotube aggregates; and a winding mechanism for winding and collecting the carbon nanotube aggregates drawn from the pre-adjustment mechanism, wherein an annular position-limiting slot capable of accommodating the carbon nanotube aggregates is provided in the contact surface of the first wheel body and/or the second wheel body for contacting the carbon nanotube aggregates.

* * * * *